(No Model.) 4 Sheets—Sheet 3.
J. N. MASKELYNE, Jr.
PROJECTING KINETOSCOPE.
No. 603,771. Patented May 10, 1898.
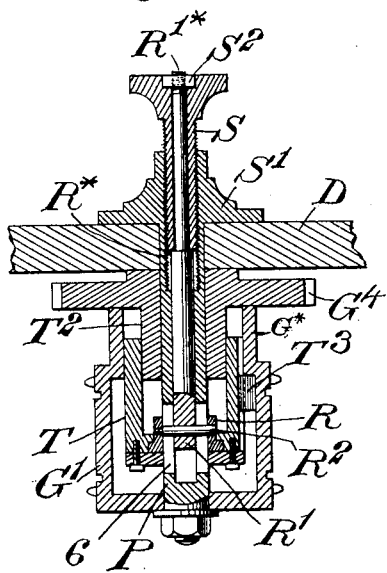
Witnesses:—
George Barry Jr.
M. E. Fletcher.
Inventor
John Nevil Maskelyne Junr
By attorneys
Brown & Seward

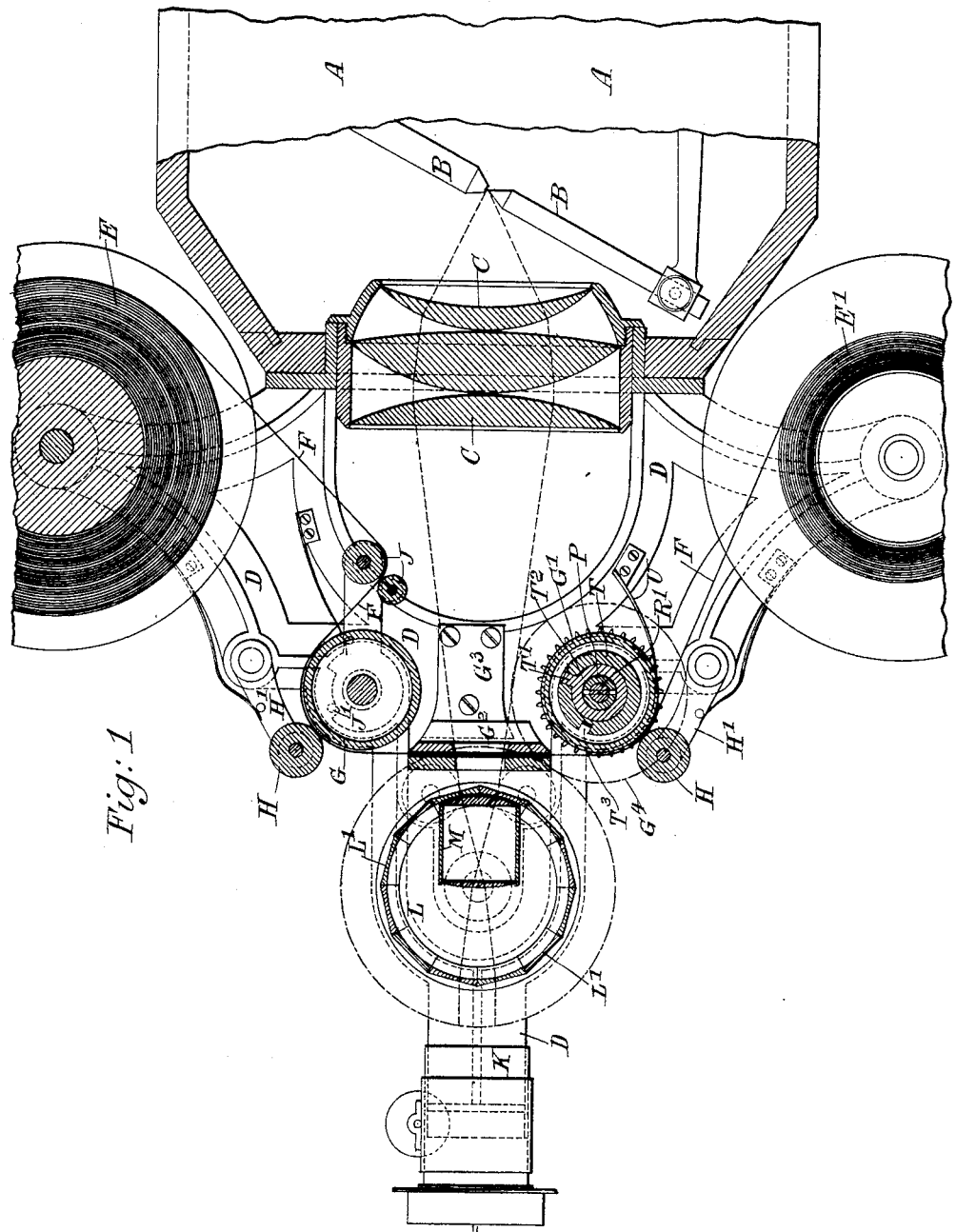

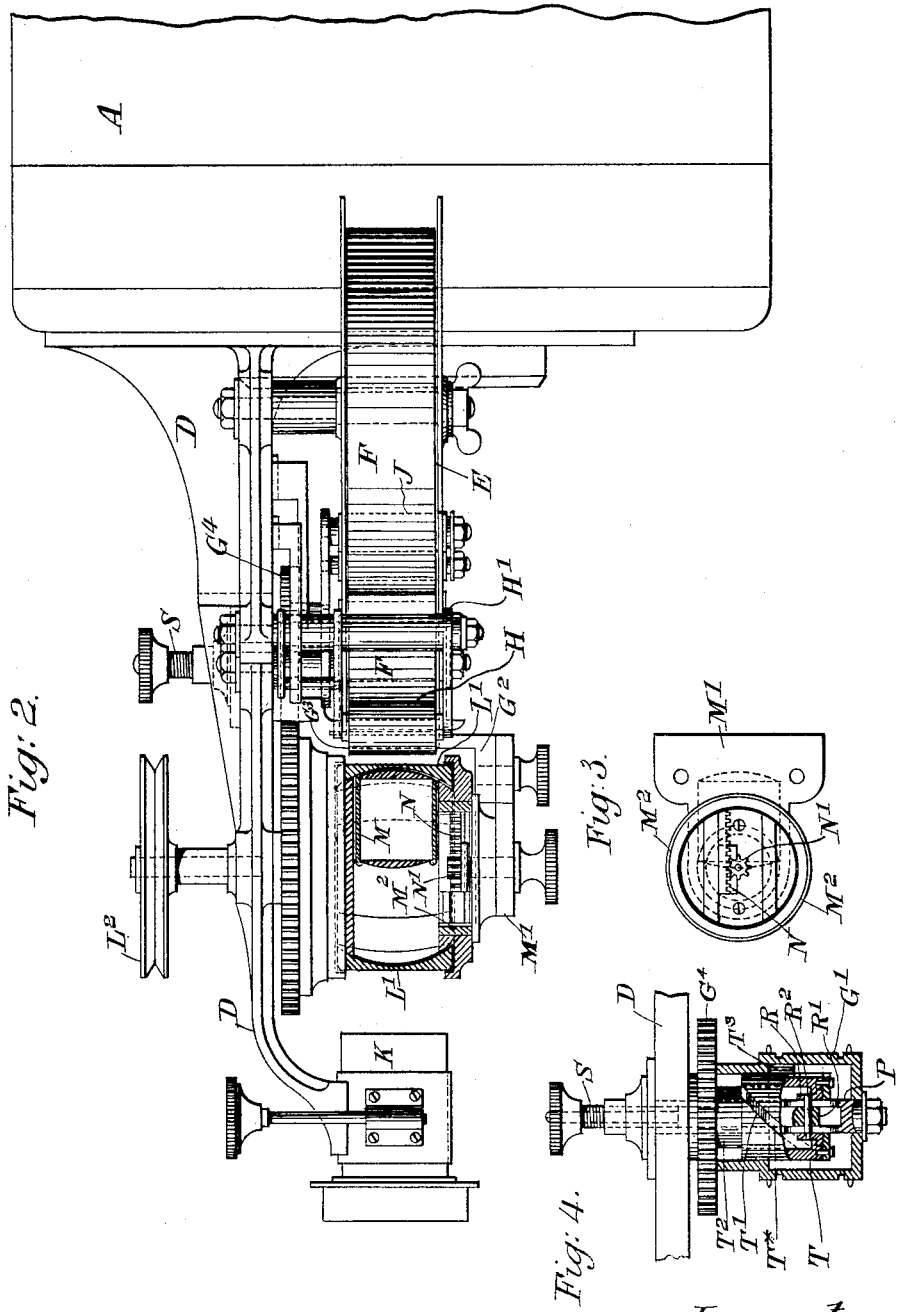

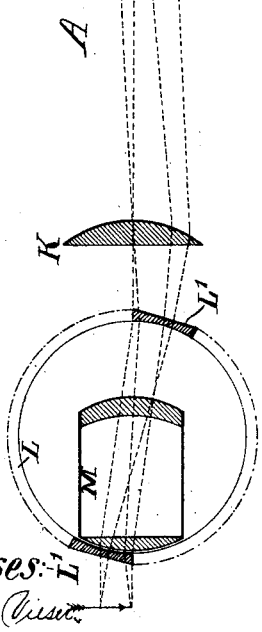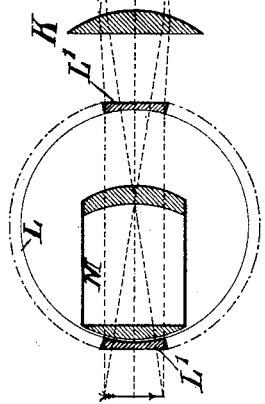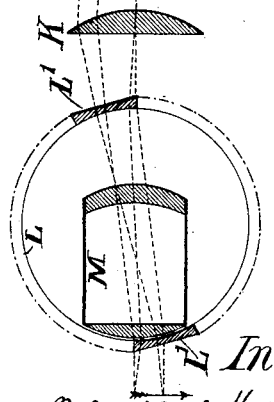

UNITED STATES PATENT OFFICE.

JOHN NEVIL MASKELYNE, JR., OF LONDON, ENGLAND.

PROJECTING KINETOSCOPE.

SPECIFICATION forming part of Letters Patent No. 603,771, dated May 10, 1898.

Application filed April 17, 1897. Serial No. 632,611. (No model.)

*To all whom it may concern:*

Be it known that I, JOHN NEVIL MASKELYNE, Jr., of the Egyptian Hall, Piccadilly, London, in the county of Middlesex, England, have invented a certain new and improved apparatus for securing or exhibiting in series records of successive phases of movement, of which the following is a specification.

The object of this invention is to provide a simple and convenient apparatus by which what are known as "moving pictures" may be more satisfactorily produced or exhibited than heretofore. There are many objections to the plans hitherto adopted for this purpose, and the present apparatus is designed to overcome these objections. The pictures, which are photographic, are taken on a continuous film, as usual, and the film is carried by a pair of drums, to which continuous rotary motion is given in any convenient manner, so that the movement of the film is continuous and not intermittent, as heretofore. This film is caused to pass in front of another drum, which is geared with the film-drums, so as to move with them. This drum consists, in effect, of a series of lenses—say concave—which are fixed edge to edge in a suitable frame provided with means by which rotary motion may be communicated thereto. Inside the drum are placed two stationary lenses in the line of the optical axis, the curvature of one or both of these lenses corresponding to that of the lenses on the drum. On the outside of the lens-drum is the projecting lens or objective, while the source of light and the condenser are behind the film.

The effect produced is as follows: Each successive picture on the film in passing across the field of view coincides with one of the lenses on the drum. The light passes through the picture on the film, thence through the corresponding lens nearest to it on the drum, the two fixed lenses, and the corresponding lens on the other side of the drum, and then through the objective, reproducing the picture on the screen. When any particular picture is central with the optical axis, the faces of the various lenses will be parallel and act as a piece of plain glass or a simple lens, and the light suffers no deviation from its course. As the parts move the refracting-surfaces change position, and the deviation thus introduced precisely compensates for the movement of the picture and causes its image to remain stationary upon the screen.

The above describes a projecting instrument; but obviously the converse may be used as a recording instrument—that is to say, the apparatus which exhibits pictures when used as a lantern may be employed to take pictures when used as a camera.

In the accompanying drawings I have shown at Figure 1, in side elevation, partly in section, the apparatus constituting the subject-matter of this invention. Fig. 2 is a plan view, partly in section. Figs. 3, 4, and 4* are detail views, which will be more particularly referred to hereinafter. Figs. 5, 6, and 7 are diagrams illustrating the action of the light in three positions of a picture-film and the corresponding positions of the lens-drum.

A will represent the body of the apparatus; B, the carbons of the electric-arc lamp or it may be any other source of light, and C the condenser of any convenient form. Attached to the body of the lantern is a bracket-frame D, which carries the parts constituting my invention.

E E' are drums, which carry the film F, and from the drum the film is drawn and is wound upon the drum E'. On its passage from the drum E to the drum E' the film passes around rollers G G' and through a guide $G^2$. The roller G is a plain roller and acts merely as a guide-roller, while the roller G' is provided at its opposite ends with pins, which take into corresponding holes along both edges of the film, and serves as a sprocket-roller to draw the film along. The guide $G^2$ is carried by a laterally-extending bracket $G^3$, secured to the bracket-frame D, and in the center of the guide $G^2$ is an opening of the size of the picture, the guide serving to keep the film flat and always in its proper position with respect to the lenses.

The rollers G G' are provided with spring-controlled pressing-rollers H, which are carried by arms H', pivoted to the frame D, and in addition there is mounted on the axle of the roller G an arm carrying a pair of yielding guide-rollers J, between which the film F passes. The amount of movement of this arm may be regulated by the pin J' and notch on the hub of the arm.

K represents the objective, which is stationary, except that it has the usual focal adjustment. Between the objective and the film the rotating lens-drum L is placed. This drum consists of a frame suitably mounted and carrying a series of concave lenses L', which form, in fact, the periphery of the drum. In the drawings twelve of these lenses are shown. This drum L is geared with the rollers G G' and is driven through a band-pulley $L^2$ in any convenient manner. Inside the drum is placed a short length of tube M, which carries at each end a convex lens, these lenses being stationary. This lens-tube is carried in the following manner: One end of the drum L is open, the diameter of the opening being sufficient to admit of the insertion and withdrawal of the tube. To the bracket $G^3$ is secured a plate M', which carries a guide $M^2$, formed to fit in the opening of the drum. In the guide $M^2$ is mounted a rack N, which gears with a pinion N' on the end of an axle mounted in the plate and guide (see the side view, Fig. 3) and provided with a milled head. To the rack the lens-tube is secured in any convenient manner. The length of the rack will be such that sufficient movement can be given to the tube to bring it into the position to be withdrawn through the opening in the side of the drum L. When the tube is in the proper position, the plate M' is unscrewed from the bracket $G^3$ and the whole withdrawn, or vice versa. The lenses may be secured to the drum in any convenient manner. For instance, they may be clamped by one end to the frame, as shown; but the other ends may be clamped to a ring, which will hold them together and steady them. This ring may be arranged to encircle and work around the guide $M^2$, which will preferably be circular to support the ring.

When placing a new film in the apparatus, it is not always possible to get the center of the picture in the exact position relative to the lenses, and I find it necessary, therefore, to provide means whereby the film may be moved irrespective of the lens-drum and other parts. The means which I employ are adapted to the sprocket-roller G' and are shown at Fig. 4, which is a plan view, partly in section, and in Fig. 4*, which represents a complete central section on a larger scale.

Attached to the frame D is a hollow fixed stud-axle P, on which the roller G' and its spur-wheel $G^4$ are mounted. This axle is slotted lengthwise near its end, as shown at 6 in Fig. 4*, and carries a collar R, which is fitted to the axle to slide thereon and secured to a rod R' inside the axle by a pin $R^2$, which passes through the slot 6. The other end of the rod R' is turned down to a smaller diameter, as shown at R'* in Fig. 4, and passes through a screw S, which screws into a socket S' in the axle. The said rod R' is attached to the screw S by a nut $S^2$, (see Fig. 4,) which is screwed onto the top of the said rod in a recess within the milled head of said screw and so holds the shoulder R* on the latter against the inner end of the screw that the screw may turn on the rod and in the axle, but the rod will be caused to move lengthwise with the screw as the latter is screwed inward or outward from the axle, the rod being prevented from turning by means of the pin $R^2$, though permitted by the slot 6 to move lengthwise within the axle. As the screw is screwed in or out of its socket in the axle so will the rod move with it either in or out. The rod R' draws with it a sleeve T, which is attached to the collar R in any convenient manner so that it will rotate. This sleeve has an inclined slot T*, (see Fig. 4,) in which works a key or feather or projection T' on the boss $T^2$ of the spur-wheel $G^4$. It will thus be seen that as the sleeve T is moved in or out by turning the screw S it will be caused to rotate by reason of the inclined slot T* and key T'; but this sleeve T has also a straight slot, in which works a key or feather $T^3$ on the inside of the sprocket-roller G', so that as the sleeve is rotated the roller G' will be rotated with it any distance required and independently of the spur-wheel $G^4$.

The roller G' is formed with an extension G*, which serves as a distance-piece to keep the roller and spur-wheel the proper distance apart. At this end the roller G' is supported by the sleeve T, which in turn is supported by the boss of the wheel $G^4$, while at its outer end the roller G' is supported on the stud-axle P.

In the periphery of the roller G' grooves will be seen in Fig. 4. These grooves are to receive stripping-fingers U, (see Fig. 1,) which serve to strip the film off the roller and prevent it from any cause sticking thereto.

The effect produced by this apparatus will be readily understood from the introduction, and further description will be unnecessary, beyond reference to the three diagrams Figs. 5, 6, and 7, which represent two opposite lenses of the rotary drum in three different positions. The position shown in Fig. 6 is a case of simple projection without any axial refraction whatever. The lenses in the positions shown in Figs. 5 and 7 are only moved half-way, the conditions being the same in both except that the refractions are reversed. Combining the lenses in the position shown in Fig. 5 with those in the position shown in Fig. 7 a complete image is produced, as in the case of Fig. 6.

It will be obvious to those familiar with optics that modifications in the above-described apparatus are possible, and I do not therefore confine myself to the exact arrangement described nor to the exact details of construction so long as the continuously-moving film and the means for introducing the necessary amount of deviation which precisely compensates for the movement of the picture are retained.

I claim—

1. Apparatus for securing, or for exhibiting in series, records of successive phases of movement, consisting of a body, of the nature of a magic lantern, a condenser, an objective, and a source of light, a series of transparent pictures, means for giving a continuous movement to the pictures, a series of continuously-moving refracting-surfaces, means for moving the same simultaneously with the pictures, and a series of fixed lenses, all substantially as and for the purpose set forth.

2. In an apparatus for producing the effect of what are termed "animated pictures," the combination of a series of pictures and means for continuously moving the same, with a rotary prism of refractive material and means for rotating the same to correspond with the movement of the film substantially as herein described, whereby there are presented to each successive picture a pair of oppositely-refracting surfaces whose inclination to the plane of the film varies in accordance with the various positions of the picture as herein set forth.

3. In apparatus for producing the effect of what are termed "moving pictures" in which a film or moving series of transparent pictures, a stationary objective and a moving series of refracting-surfaces between the objective and the condenser are employed, the combination with the film or series of pictures and means for carrying the same, of means for moving the film and the refracting-surfaces simultaneously and means for moving the film independently of the refracting-surfaces, as and for the purpose herein set forth.

JOHN NEVIL MASKELYNE, Jr.

Witnesses:
FRED C. HARRIS,
GEO. J. B. FRANKLIN.